US008170358B2

(12) United States Patent
Chen et al.

(10) Patent No.: US 8,170,358 B2
(45) Date of Patent: May 1, 2012

(54) IMAGE PROCESSING METHOD

(75) Inventors: Chien-Hung Chen, Taipei County (TW); Meng-Chao Kao, Taipei (TW); Hsiang-Tan Lin, Keelung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 565 days.

(21) Appl. No.: 12/325,258

(22) Filed: Nov. 30, 2008

(65) Prior Publication Data

US 2010/0061646 A1 Mar. 11, 2010

(30) Foreign Application Priority Data

Sep. 8, 2008 (TW) .............................. 97134457 A

(51) Int. Cl.
*G06K 9/46* (2006.01)

(52) U.S. Cl. ........ 382/244; 382/232; 382/233; 382/250; 382/251; 375/240.01

(58) Field of Classification Search .................. 382/232, 382/233, 244, 245, 246, 247, 248, 250, 251, 382/252, 253; 358/426.1, 426.16, 298, 455, 358/462, 530; 375/240.01, 240.29
See application file for complete search history.

(56) References Cited

U.S. PATENT DOCUMENTS 5,051,929 A * 9/1991 Tutt et al. ...................... 345/593
5,455,681 A * 10/1995 Ng .............................. 358/3.01
7,750,887 B2 * 7/2010 Bergquist ...................... 345/102
2008/0150864 A1 * 6/2008 Bergquist ...................... 345/89

FOREIGN PATENT DOCUMENTS

CN 1652188 8/2005

OTHER PUBLICATIONS

"First Office Action of China Counterpart Application", issued on Mar. 23, 2010, p1-p3, in which the listed reference was cited.

* cited by examiner

*Primary Examiner* — Samir Ahmed
*Assistant Examiner* — Ali Bayat
(74) *Attorney, Agent, or Firm* — Jianq Chyun IP Office

(57) ABSTRACT

An image processing method is provided. The image processing method includes obtaining a least significant bit (LSB) associated with a pixel block. Further, two bits are reduced from a bit number of each of the pixels of the pixel block. Thereafter whether to carry the pixel or not is determined according to the LSB. When the LSB is 01 or 11, the carry manners of each pixel of the pixel block in two consecutive frames are asymmetric one to another. Further, under the conditions of when the LSB is 01 and 11, respectively, the carry manners of the pixels of the pixel block mutually compensate. Therefore, the display performance of a display is improved.

13 Claims, 16 Drawing Sheets

| LSB 2-bit | | First Frame (Carry Bit) | | Second Frame (Carry Bit) | | Third Frame (Carry Bit) | | Fourth Frame (Carry Bit) | |
|---|---|---|---|---|---|---|---|---|---|
| 00 | 00 | 0 | 0 | 0 | 0 | 0 | 0 | 0 | 0 |
| 00 | 00 | 0 | 0 | 0 | 0 | 0 | 0 | 0 | 0 |
| 01 | 01 | 1 | 0 | 0 | 0 | 0 | 0 | 0 | 1 |
| 01 | 01 | 0 | 0 | 0 | 1 | 1 | 0 | 0 | 0 |
| 10 | 10 | 1 | 0 | 0 | 1 | 1 | 0 | 0 | 1 |
| 10 | 10 | 0 | 1 | 1 | 0 | 0 | 1 | 1 | 0 |
| 11 | 11 | 0 | 1 | 1 | 1 | 1 | 1 | 1 | 0 |
| 11 | 11 | 1 | 1 | 1 | 0 | 0 | 1 | 1 | 1 |

FIG. 1 (PRIOR ART)

First Frame

| | | | |
|---|---|---|---|
| 000001 (1,1) | 000000 (1,2) | 000001 (1,3) | 000000 (1,4) |
| 000000 (2,1) | 000000 (2,2) | 000000 (2,3) | 000000 (2,4) |
| 000001 (3,1) | 000000 (3,2) | 000001 (3,3) | 000000 (3,4) |
| 000000 (4,1) | 000000 (4,2) | 000000 (4,3) | 000000 (4,4) |

21

FIG. 5B

22

Second Frame

| | | | |
|---|---|---|---|
| 000000<br>(1,1) | 000000<br>(1,2) | 000000<br>(1,3) | 000001<br>(1,4) |
| 000000<br>(2,1) | 000001<br>(2,2) | 000000<br>(2,3) | 000000<br>(2,4) |
| 000000<br>(3,1) | 000000<br>(3,2) | 000000<br>(3,3) | 000001<br>(3,4) |
| 000000<br>(4,1) | 000001<br>(4,2) | 000000<br>(4,3) | 000000<br>(4,4) |

FIG. 5C

23

Third Frame

| | | | |
|---|---|---|---|
| 000000 (1,1) | 000000 (1,2) | 000000 (1,3) | 000000 (1,4) |
| 000001 (2,1) | 000000 (2,2) | 000001 (2,3) | 000000 (2,4) |
| 000000 (3,1) | 000000 (3,2) | 000000 (3,3) | 000000 (3,4) |
| 000001 (4,1) | 000000 (4,2) | 000001 (4,3) | 000000 (4,4) |

FIG. 5D

Fourth Frame

| | | | |
|---|---|---|---|
| 000000 (1,1) | 000001 (1,2) | 000000 (1,3) | 000000 (1,4) |
| 000000 (2,1) | 000000 (2,2) | 000000 (2,3) | 000001 (2,4) |
| 000000 (3,1) | 000001 (3,2) | 000000 (3,3) | 000000 (3,4) |
| 000000 (4,1) | 000000 (4,2) | 000000 (4,3) | 000001 (4,4) |

24

FIG. 5E

IMAGE PROCESSING METHOD

CROSS-REFERENCE TO RELATED APPLICATION

This application claims the priority benefit of Taiwan application serial no. 97134457, filed on Sep. 8, 2008. The entirety of the above-mentioned patent application is hereby incorporated by reference herein and made a part of this specification.

BACKGROUND OF THE INVENTION

1. Field of the Invention

The present invention generally relates to an image processing method, and more particularly, to a carry manner of pixels of a pixel block upon a reduction of bit numbers of the pixels.

2. Description of Related Art

Among the current image processing technologies, dither technology is one for improving a grey level resolution. For example, when a 6-bit driving chip is used to display an 8-bit image, a typical solution is to convert the 8-bit image into a 6-bit image. In order to reduce the loss of information during the conversion from the 8-bit image to the 6-bit image, the pixels are usually carried respectively during the conversion. Details are to be illustrated herebelow facilitated with drawings.

FIG. 1 schematically illustrates a conventional carry manner of a 2×2 pixel block. FIG. 2 is a schematic diagram illustrating a conventional conversion from an 8-bit pixel block to a 6-bit pixel block. Referring to FIGS. 1 and 2 together, for example, a pixel resolution of a display assumed to be 1920×1200 is provided for viewing the 2×2 pixel block. Here, we suppose that the display is going to convert the 8-bit pixel block 10 into a 6-bit pixel block, in which the 8-bit pixel block 10 is constituted by pixels (1, 1), (1, 2), (2, 1), and (2, 2).

First, the display detects a least significant bit (LSB), and the LSB is detected to be 10. Then, as shown in FIG. 1, a carry manner of subsequent consecutive frames is determined according to the LSB. Accordingly, in a first frame, the 8-bit pixel block 10 is converted to a 6-bit pixel block 11, in which the pixels (1, 1) and (2, 2) are carried, and pixels (1, 2) and (2, 1) are remained non-carried. In a second frame, the 8-bit pixel block 10 is converted to a 6-bit pixel block 12, in which the pixels (1, 2) and (2, 1) are carried, and pixels (1, 1) and (2, 2) are remained non-carried. In a third frame, the 8-bit pixel block 10 is converted to a 6-bit pixel block 13, in which the pixels (1, 1) and (2, 2) are carried, and pixels (1, 2) and (2, 1) are remained non-carried. In a fourth frame, the 8-bit pixel block 10 is converted to a 6-bit pixel block 14, in which the pixels (1, 2) and (2, 1) are carried, and pixels (1, 1) and (2, 2) are remained non-carried.

It should be noted that displaying performance of the display varies in accordance with different manners employed for carrying the pixel blocks. The carry manner as shown in FIG. 1 usually causes image flickering which leads to an unsatisfactory displaying performance. As such, a further conventional technology provides another carry manner as discussed below.

FIG. 3 schematically illustrates a carry manner of a 4×4 pixel block. The carry manner of FIG. 3, to some degree, improves the flickering image. However, as shown in FIG. 3, when the LSB value is 01 or 11, the carry manners of each pixel of a pixel block in two consecutive frames are symmetric one to another. Such symmetric carry manners often cause transverse striations and/or vertical striations, which seriously destroys the displaying performance of the display.

SUMMARY OF THE INVENTION

Accordingly, the present invention is directed to provide an image processing method, for improve a displaying performance of a display.

The present invention provides an image processing method. The image processing method includes obtaining a least significant bit (LSB) associated with a pixel block, in which the LSB is a 2-bit number. The pixel block includes 4×4 pixels including (1, 1), (1, 2), (1, 3), (1, 4), (2, 1), (2, 2), (2, 3), (2, 4), (3, 1), (3, 2), (3, 3), (3, 4), (4, 1), (4, 2), (4, 3), and (4, 4). Then, two bits are reduced from a bit number of each of the pixels of the pixel block, and thereafter whether to carry the pixel or not is determined according to the LSB. When the LSB is 01, in a first frame, the pixels (1, 1), (1, 3), (3, 1), and (3, 3) of the pixel block are carried, while the rest pixels of the pixel block are remained non-carried; in a second frame, the pixels (1, 4), (2, 2), (3, 4), and (4, 2) of the pixel block are carried, while the rest pixels of the pixel block are remained non-carried; in a third frame, the pixels (2, 1), (2, 3), (4, 1), and (4, 3) of the pixel block are carried, while the rest pixels of the pixel block are remained non-carried; and in a fourth frame, the pixels (1, 2), (2, 4), (3, 2), and (4, 4) of the pixel block are carried, while the rest pixels of the pixel block are remained non-carried. When the LSB is 11, in the first frame, the pixels (1, 1), (1, 3), (3, 1), and (3, 3) of the pixel block are remained non-carried, while the rest pixels of the pixel block are carried; in the second frame, the pixels (1, 4), (2, 2), (3, 4), and (4, 2) of the pixel block are remained non-carried, while the rest pixels of the pixel block are carried; in the third frame, the pixels (2, 1), (2, 3), (4, 1), and (4, 3) of the pixel block are remained non-carried, while the rest pixels of the pixel block are carried; and in the fourth frame, the pixels (1, 2), (2, 4), (3, 2), and (4, 4) of the pixel block are remained non-carried, while the rest pixels of the pixel block are carried.

According to an embodiment of the present invention, the image processing method further includes remaining each of the pixels non-carried in the first frame, the second frame, the third frame, and the fourth frame, when the LSB is 00.

According to an embodiment of the present invention, the image processing method further includes carrying the pixels (1, 1), (1, 2), (2, 3), (2, 4), (3, 1), (3, 2), (4, 3), and (4, 4), while remaining the rest pixels of the pixel block non-carried in the first and third frames, and carrying the pixels (1, 3), (1, 4), (2, 1), (2, 2), (3, 3), (3, 4), (4, 1), and (4, 2), while remaining the rest pixels of the pixel block non-carried in the second and fourth frames, when the LSB is 10.

According to an embodiment of the present invention, the image processing method further includes carrying the pixels (1, 3), (1, 4), (2, 1), (2, 2), (3, 3), (3, 4), (4, 1), and (4, 2), while remaining the rest pixels of the pixel block non-carried in the first and third frames, and carrying the pixels (1, 1), (1, 2), (2, 3), (2, 4), (3, 1), (3, 2), (4, 3), and (4, 4), while remaining the rest pixels of the pixel block non-carried in the second and fourth frames, when the LSB is 10.

According to an embodiment of the present invention, the image processing method further includes carrying the pixels (1, 1), (1, 4), (2, 2), (2, 3), (3, 2), (3, 3), (4, 1), and (4, 4), while remaining the rest pixels of the pixel block non-carried in the first and third frames, and carrying the pixels (1, 2), (1, 3), (2, 1), (2, 4), (3, 1), (3, 4), (4, 2), and (4, 3), while remaining the rest pixels of the pixel block non-carried in the second and fourth frames, when the LSB is 10.

According to an embodiment of the present invention, the image processing method further includes carrying the pixels (1, 2), (1, 3), (2, 1), (2, 4), (3, 1), (3, 4), (4, 2), and (4, 3), while remaining the rest pixels of the pixel block non-carried in the first and third frames; and carrying the pixels (1, 1), (1, 4), (2, 2), (2, 3), (3, 2), (3, 3), (4, 1), and (4, 4), while remaining the rest pixels of the pixel block non-carried in the second and fourth frames, when the LSB is 10.

According to an embodiment of the present invention, the pixels (1, 1), (1, 4), (4, 1) and (4, 4) are distributed at an upper left corner, an upper right corner, a lower left corner, and a lower right corner of the pixel block. In another embodiment of the present invention, the pixels (1, 1), (1, 4), (4, 1) and (4, 4) are distributed at an upper right corner, an upper left corner, a lower right corner, and a lower left corner of the pixel block.

According to an embodiment of the present invention, the first frame, the second frame, the third frame, and the fourth frame are consecutive frames sequentially. In another embodiment, the second frame, the third frame, the fourth frame, and the first frame are consecutive frames sequentially. In still another embodiment, the third frame, the fourth frame, the first frame, and the second frame are consecutive frames sequentially. In a further embodiment, the fourth frame, the first frame, the second frame, and the third frame, are consecutive frames sequentially.

According to an embodiment of the present invention, each of the pixels of the pixel block in a $4N+1^{th}$ frame is carried in a same carry manner as in the first frame, each of the pixels of the pixel block in a $4N+2^{th}$ frame is carried in a same carry manner as in the second frame, each of the pixels of the pixel block in a $4N+3^{th}$ frame is carried in a same carry manner as in the third frame, and each of the pixels of the pixel block in a $4N+4^{th}$ frame is carried in a same carry manner as in the fourth frame, in which N is a natural number greater than 0.

In the present invention, when the LSB is 01 or 11, the carry manners of each pixel of the pixel block in two consecutive frames are asymmetric one to another. Therefore, the display performance of a display is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 schematically illustrates a conventional carry manner of a 2×2 pixel block.

FIGS. 5A through 5E are schematic diagrams illustrating a conversion from an 8-bit pixel block to a 6-bit pixel block according to embodiments of the present invention.

DESCRIPTION OF THE EMBODIMENTS

Figure 2:
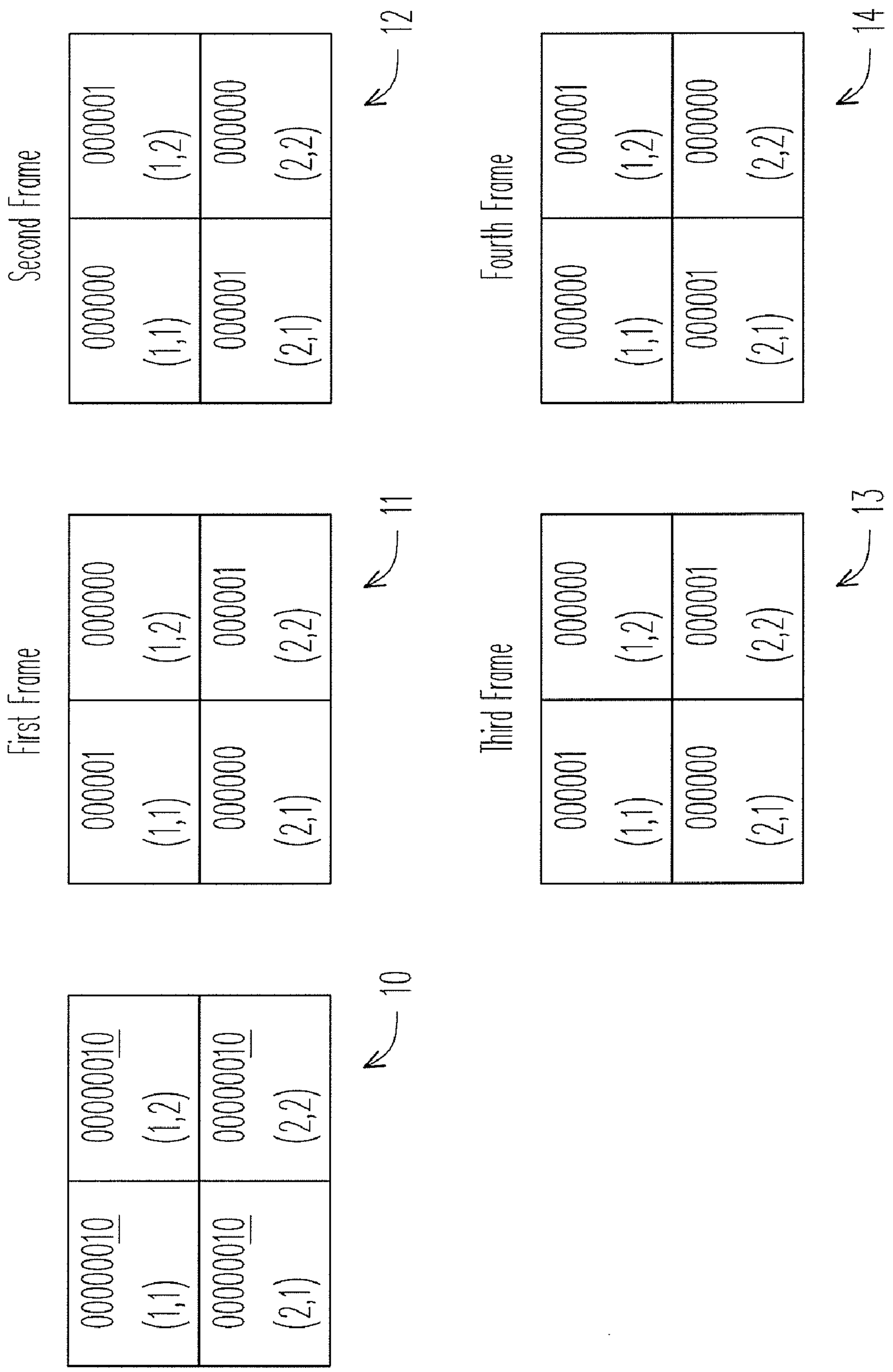
FIG. 2 (PRIOR ART)
FIG. 2 is a schematic diagram illustrating a conventional conversion from an 8-bit pixel block to a 6-bit pixel block.
Figure 3:
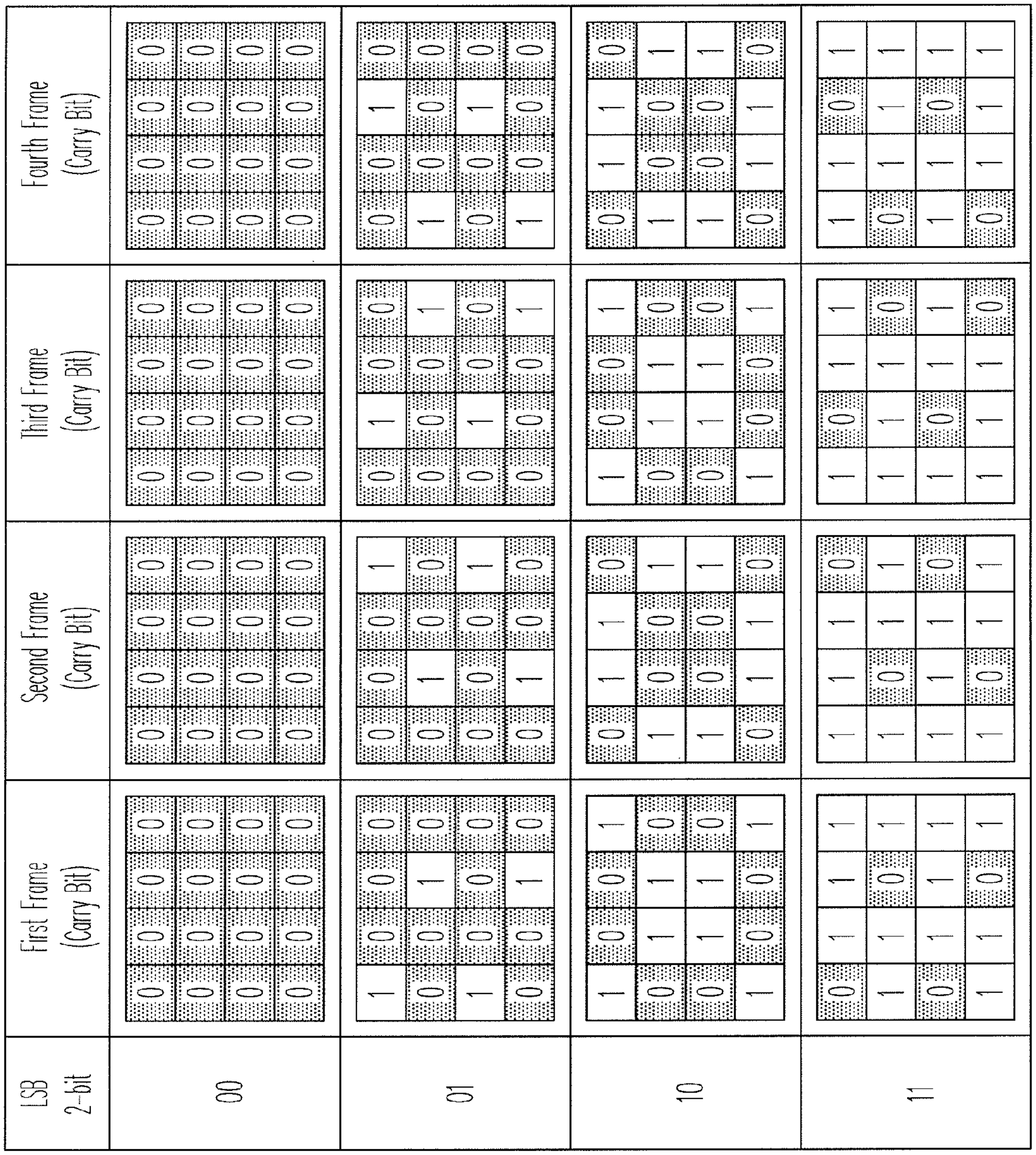
FIG. 3 (PRIOR ART)
FIG. 3 schematically illustrates a carry manner of a 4×4 pixel block in the prior art.

Reference will now be made in detail to the present preferred embodiments of the invention, examples of which are illustrated in the accompanying drawings. Wherever possible, the same reference numbers are used in the drawings and the description to refer to the same or like parts.

As discussed above, in the conventional technologies, when the LSB is 01 or 11, the carry manners of each pixel of a pixel block in two consecutive frames are symmetric one to another. Such symmetric carry manners often cause transverse striations and/or vertical striations, which seriously destroys the displaying performance of the display. As such, embodiments of the present invention provide an image processing method. According to the image processing method, when the LSB is 01 or 11, the carry manners of each pixel of the pixel block in two consecutive frames are asymmetric one to another. And therefore, the display performance of the display is improved.

Figure 4:
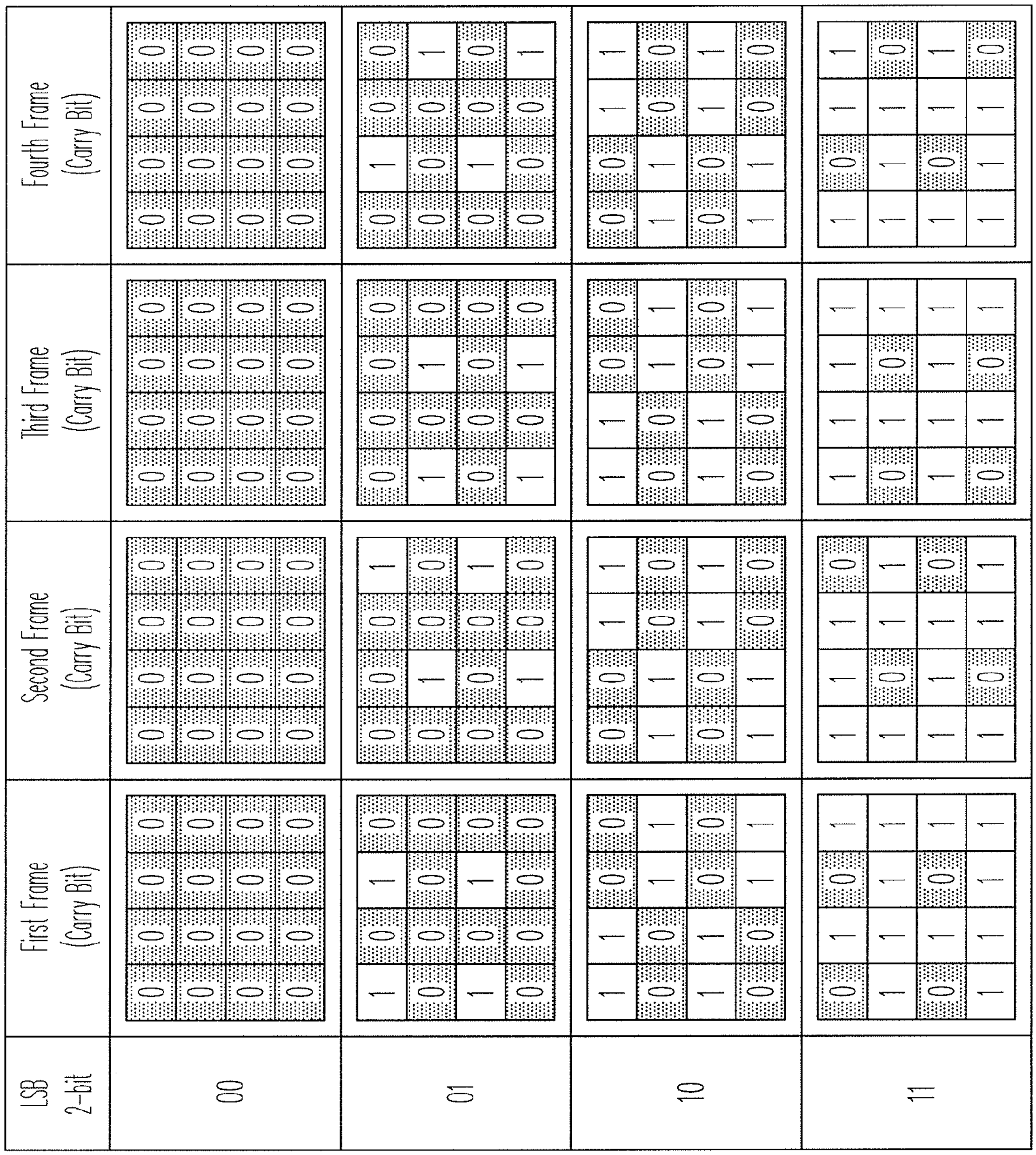
FIG. 4 is a schematic diagram illustrating a carry manner of a 4×4 pixel block according to a first embodiment of the present invention.
Figure 5A:
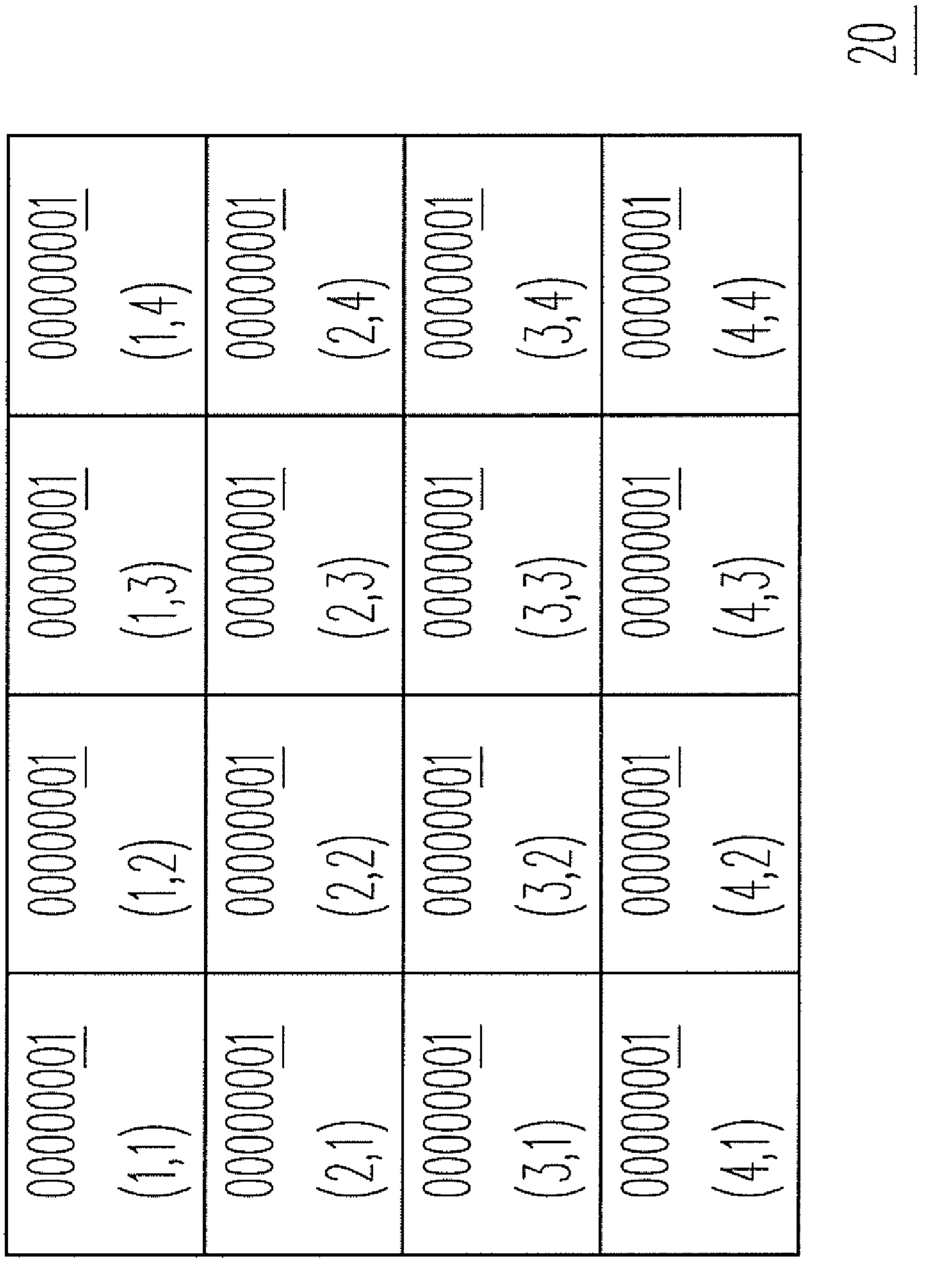
Figure 6:
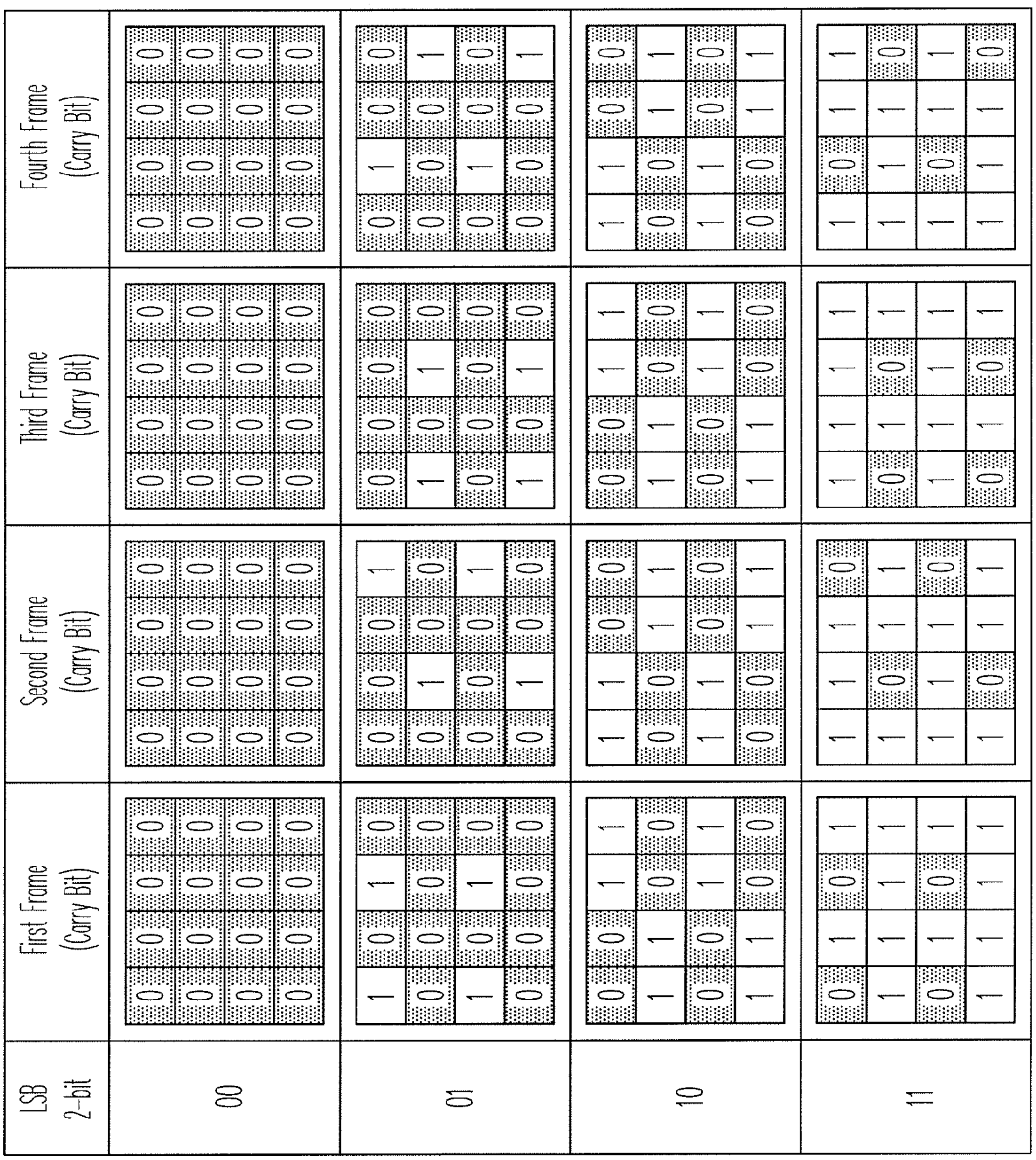
FIGS. 6 through 12 respectively illustrate 7 carry manners for a 4×4 pixel block, according to embodiments of the present invention.
Figure 7:
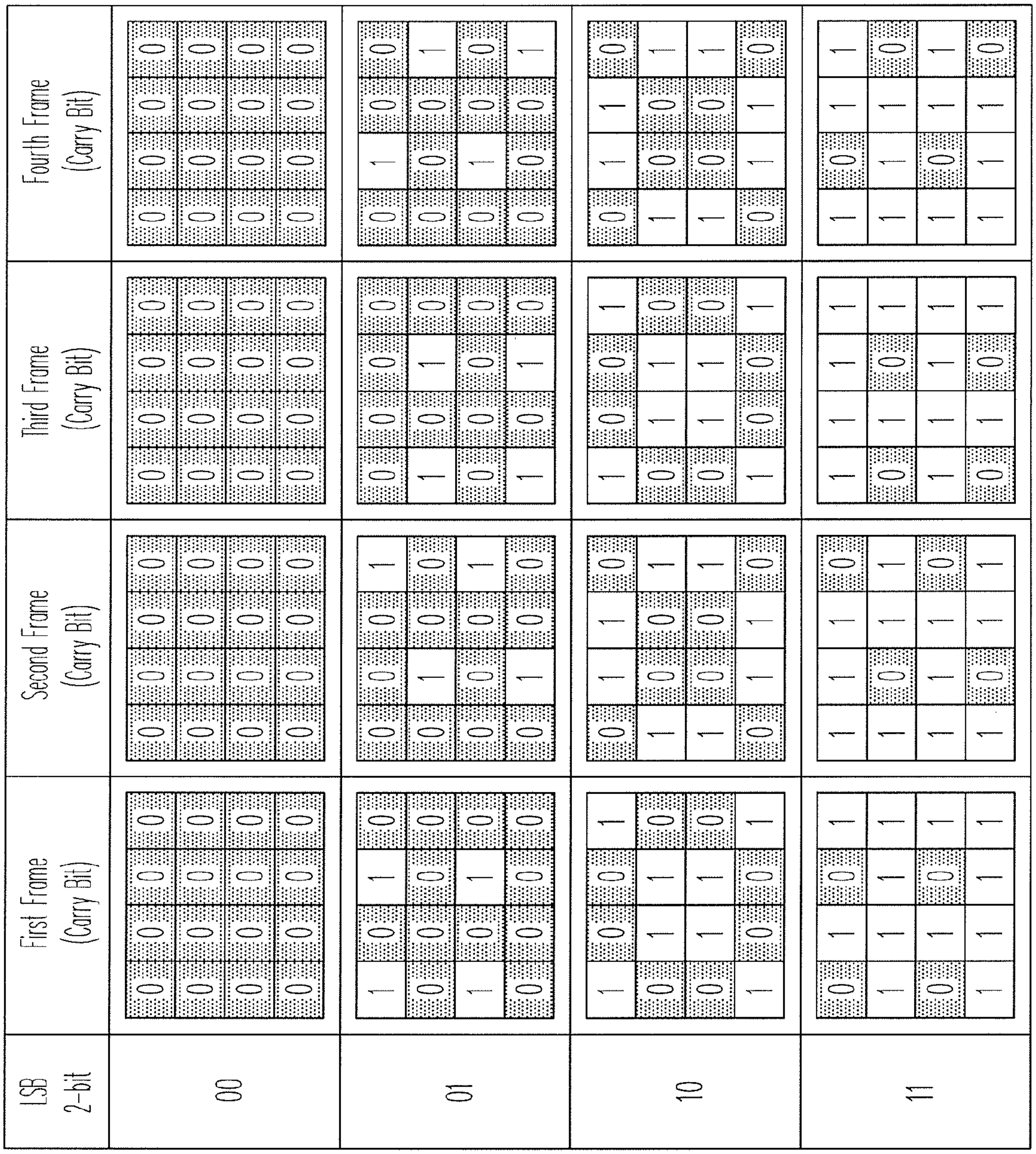
Figure 8:
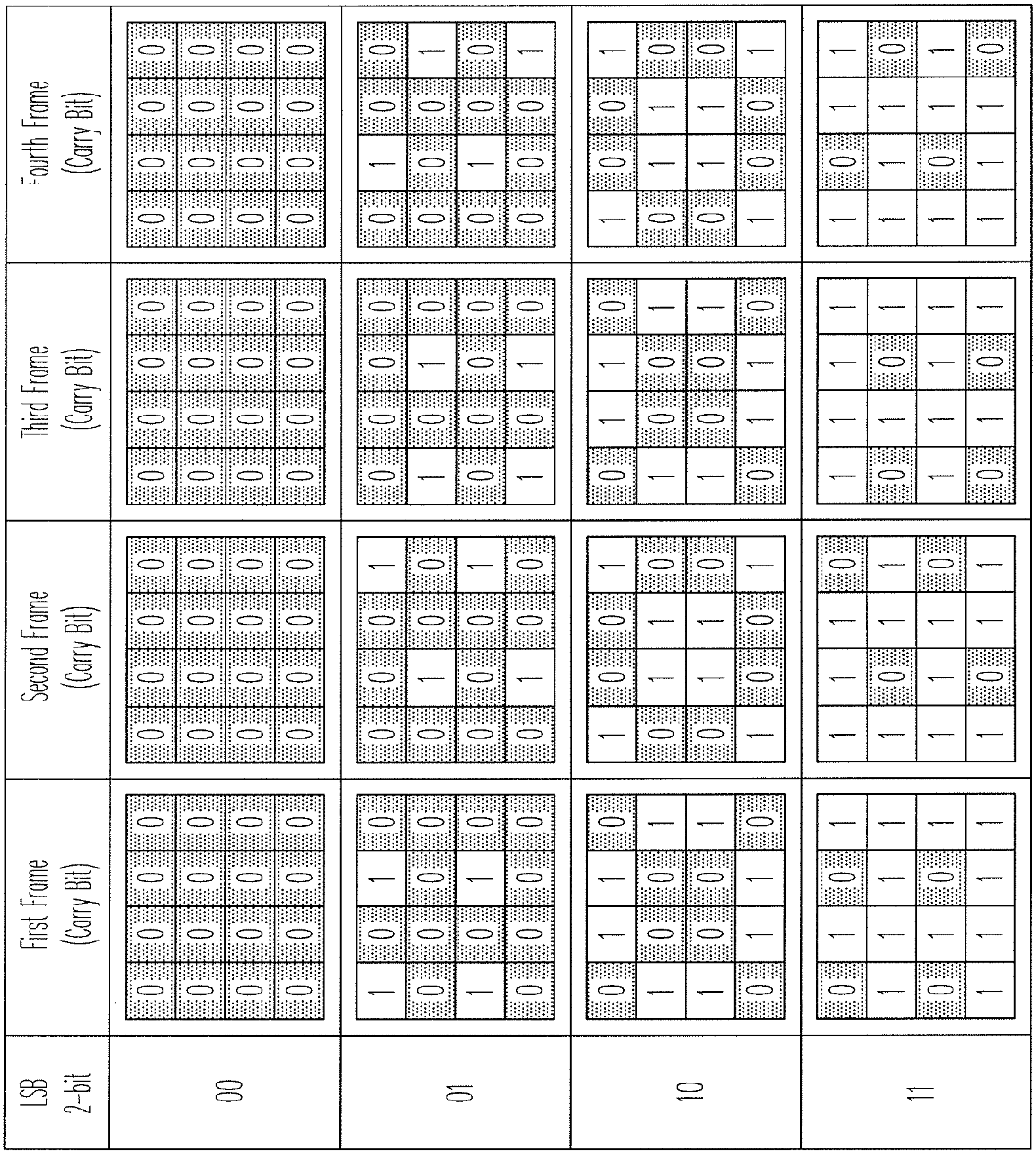
Figure 9:
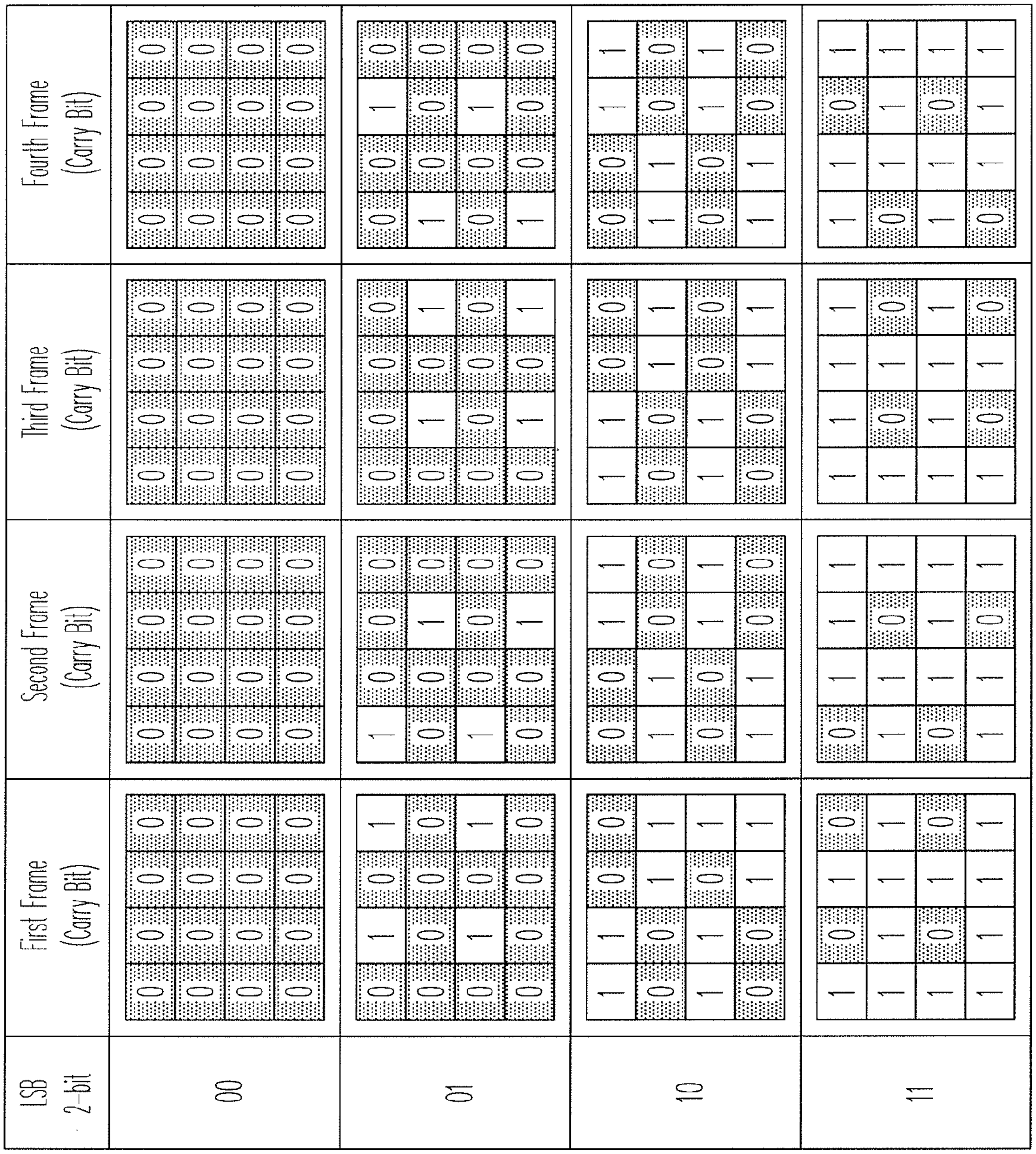
Figure 10:
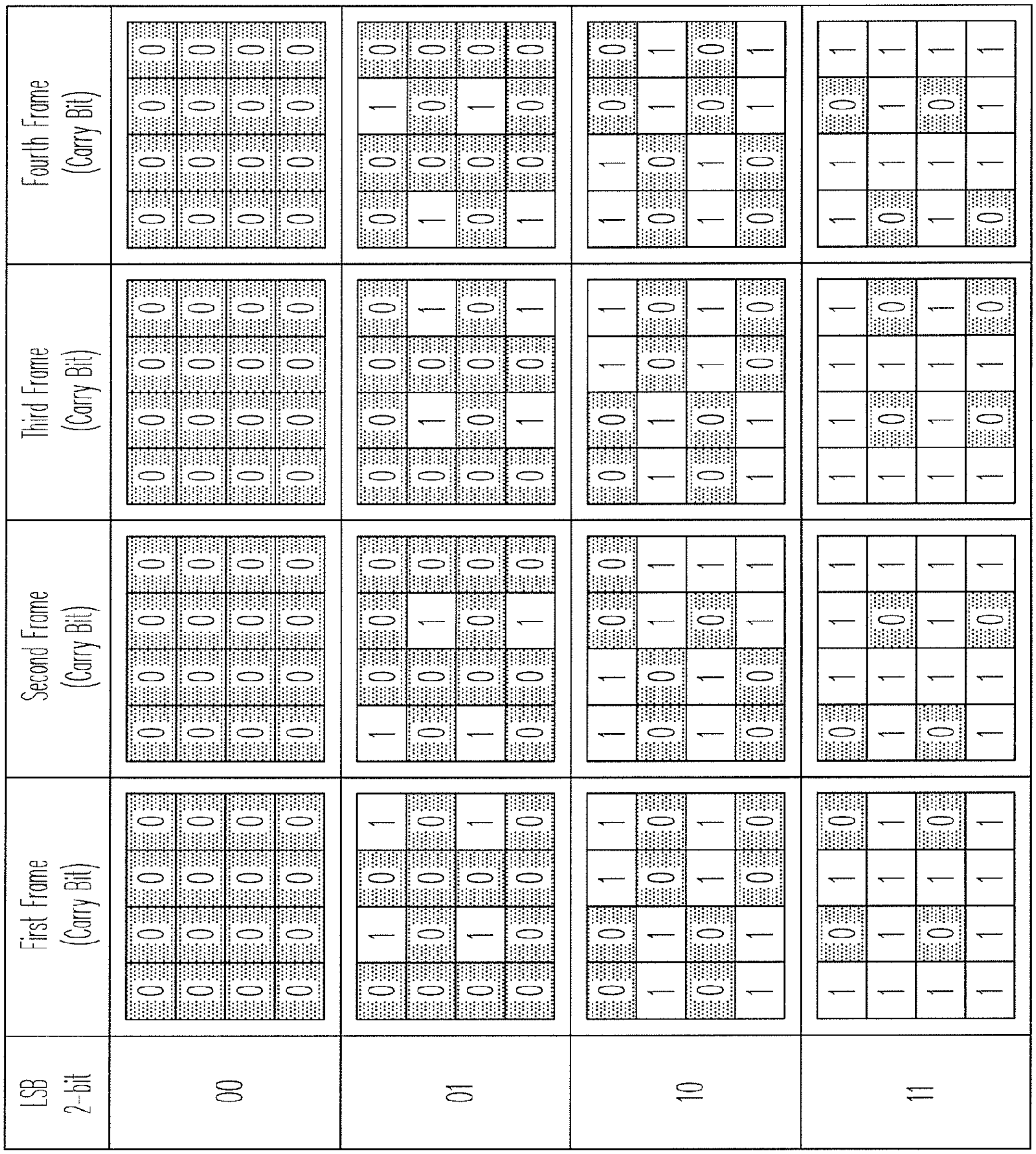
Figure 11:
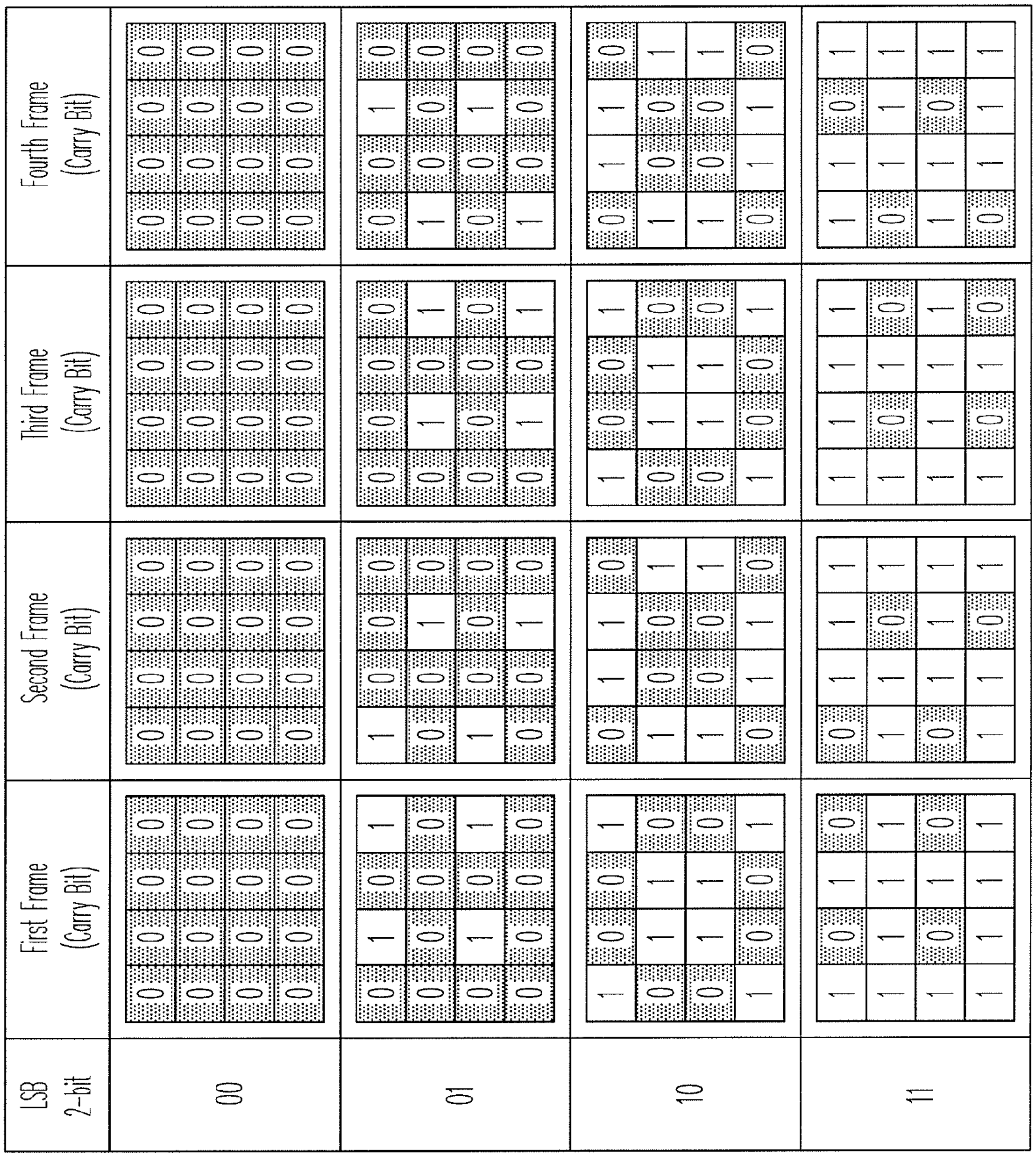
Figure 12:
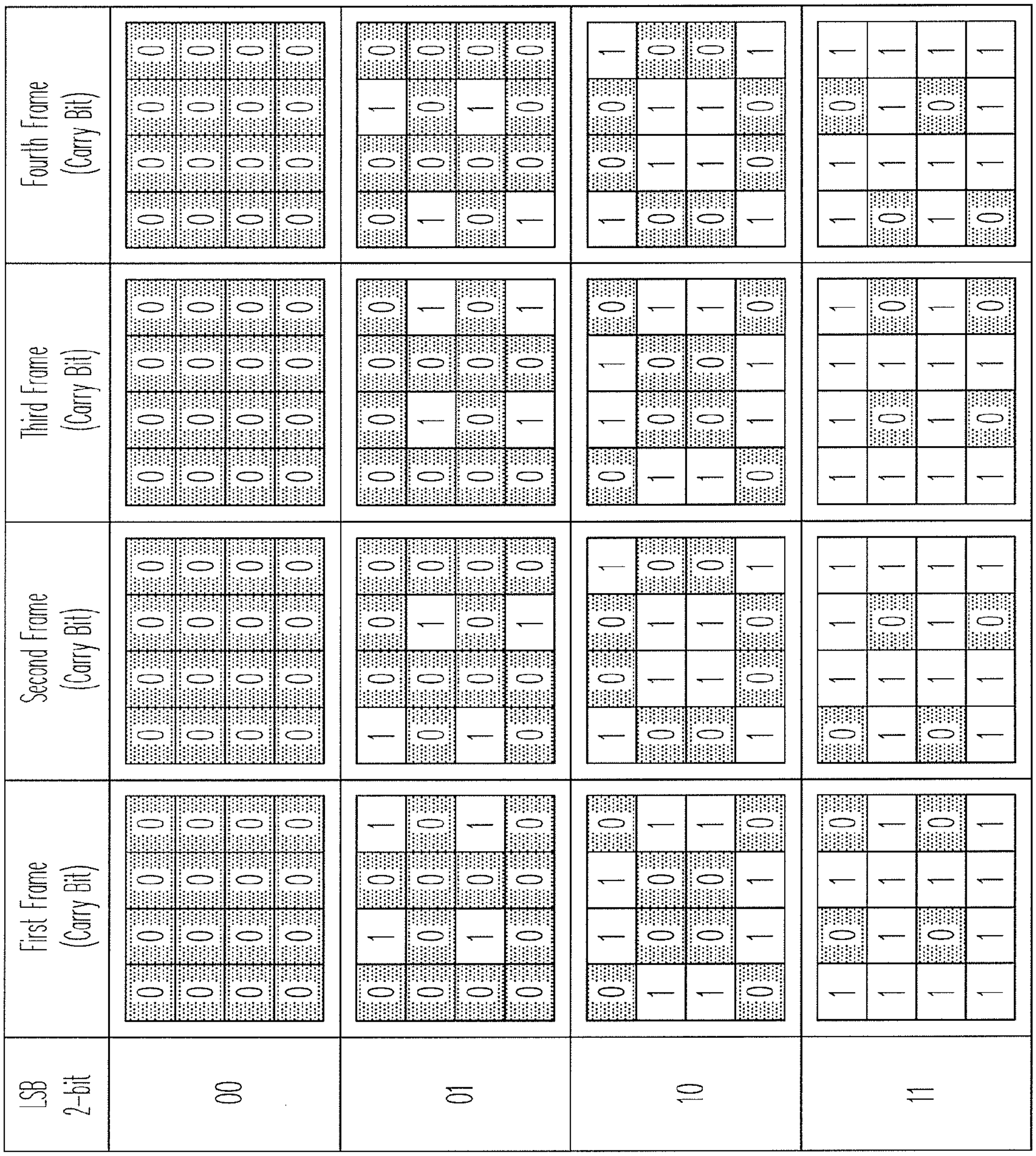

FIG. 4 is a schematic diagram illustrating a carry manner of a 4×4 pixel block according to a first embodiment of the present invention. FIGS. 5A through 5E are schematic diagrams illustrating a conversion from an 8-bit pixel block to a 6-bit pixel block according to embodiments of the present invention. Referring to FIG. 4 and FIGS. 5A through 5E together, for example, a pixel resolution of a display assumed to be 1920×1200, and a viewing unit assumed to be a 4×4 pixel block. In addition, we suppose that the display is going to convert an 8-bit pixel block 20 into a 6-bit pixel block, in which the 8-bit pixel block 20 is constituted by pixels (1, 1), (1, 2), (1, 3), (1, 4), (2, 1), (2, 2), (2, 3), (2, 4), (3, 1), (3, 2), (3, 3),(3, 4), (4, 1), (4, 2), (4, 3), and (4, 4).

At first, the display obtains a least significant bit (LSB) of the pixel block 20, and the LSB is a 2-bit number. In the present embodiment, an average of LSBs of all pixels of the pixel block 20 is taken as the LSB associated with the pixel block 20. However, the present invention is not restricted as such. Those skilled in the art may vary to obtain the LSB associated with the pixel block in other ways as desired. For example, in other embodiments, an LSB of any one pixel of the pixel block 20 can be selected serving as the LSB associated with the pixel block 20. In the present embodiment, the average of the LSBs of the pixels of the pixel block 20 is 01, and therefore 01 is taken as the LSB associated with the pixel block 20 hereby.

Then, referring to FIG. 4, the LSB (i.e., 01) associated with the pixel block 20 is accorded to determine a carry maimer of subsequent consecutive frames. As such, in a first frame, the 8-bit pixel block 20 is converted into a 6-bit pixel block 21, in which the pixels (1, 1), (1, 3), (3, 1), and (3, 3) are carried, while the rest pixel are remained non-carried, as shown in FIG. 5B. In a second frame, the 8-bit pixel block 20 is converted into a 6-bit pixel block 22, in which the pixels (1, 4), (2, 2), (3, 4), and (4, 2) are carried, while the rest pixel are remained non-carried, as shown in FIG. 5C. In a third frame, the 8-bit pixel block 20 is converted into a 6-bit pixel block 23, in which the pixels (2, 1), (2, 3), (4, 1), and (4, 3) are carried, while the rest pixel are remained non-carried, as shown in FIG. 5D. In a fourth frame, the 8-bit pixel block 20 is converted into a 6-bit pixel block 24, in which the pixels (1, 2), (2, 4), (3, 2), and (4, 4) are carried, while the rest pixel are remained non-carried, as shown in FIG. 5E.

Likewise, each of the pixels of the pixel block in a $4N+1^{th}$ frame can be carried in a same carry manner as in the first frame. Each of the pixels of the pixel block in a $4N+2^{th}$ frame can be carried in a same carry manner as in the second frame. Each of the pixels of the pixel block in a $4N+3^{th}$ frame can be carried in a same carry manner as in the third frame. Each of the pixels of the pixel block in a $4N+4^{th}$ frame can be carried in a same carry manner as in the fourth frame. N is a natural number greater than 0.

Further, as discussed above, those skilled in the art should be taught that in accordance with the carry manner shown in FIG. 4, when the LSB of the pixel block 20 is 00, all pixels are remained non-carried in the first through the fourth frames during the conversion from the 8-bit pixel block 20 to the 6-bit pixel block.

When LSB of the pixel block 20 is 10, in the first and the third frames, the 8-bit pixel block 20 is converted into a 6-bit pixel block, in which the pixels (1, 1), (1, 2), (2, 3), (2, 4), (3, 1), (3, 2), (4, 3), and (4, 4) are carried, while the rest pixels of the pixel block are remained non-carried in the first and third frames. And in the second and fourth frames, the 8-bit pixel block 20 is converted into a 6-bit pixel block, in which the pixels (1, 3), (1, 4), (2, 1), (2, 2), (3, 3), (3, 4), (4, 1), and (4, 2) are carried, while the rest pixels of the pixel block are remained non-carried.

When the LSB of the pixel block 20 is 11, in the first frame, the 8-bit pixel block 20 is converted into a 6-bit pixel block, in which the pixels (1, 1), (1, 3), (3, 1), and (3, 3) of the pixel block are remained non-carried, while the rest pixels of the pixel block are carried. In the second frame, the 8-bit pixel block 20 is converted into a 6-bit pixel block, in which the pixels (1, 4), (2, 2), (3, 4), and (4, 2) of the pixel block are remained non-carried, while the rest pixels of the pixel block are carried. In the third frame, the 8-bit pixel block 20 is converted into a 6-bit pixel block, in which the pixels (2, 1), (2, 3), (4, 1), and (4, 3) of the pixel block are remained non-carried, while the rest pixels of the pixel block are carried. In the fourth frame, the 8-bit pixel block 20 is converted into a 6-bit pixel block, in which the pixels (1, 2), (2, 4), (3, 2), and (4, 4) of the pixel block are remained non-carried, while the rest pixels of the pixel block are carried.

It should be noted that when the LSB is 01 or 11, the carry manners of each pixel of the pixel block in two consecutive frames are asymmetric one to another. Thus, the present embodiment can effectively avoid the occurrence of transverse striations and/or vertical striations. Further, under the conditions of when the LSB is 01 and 11, respectively, the carry manners of the pixels of the pixel block mutually compensate, and therefore the present embodiment may improve the display performance of the display.

Although a reasonable configuration of an image processing method has been figured out as shown in the foregoing embodiments, those skilled in the art should understand that different manufacturers incline to different design procedures. As such, the present invention should not be construed exactly as the given configuration shown above. In other words, if only when the LSB is 01 or 11, the carry manners of each pixel of the pixel block in two consecutive frames are asymmetric one to another, it falls within the scope of the present invention. For allowing those skilled in the art to better understand the spirit of the present invention and thus applying the present invention, more embodiments are to be illustrated herebelow.

In the foregoing embodiments, the carry manner as shown in FIG. 4 is only an option in the embodiment, and is not restricted by the present invention. In other embodiments, carry manners of the pixels of the pixel block can be varied by those skilled in the art as desired in accordance with the spirit of the present invention as taught above. For example, FIGS. 6 through 12 respectively illustrate 7 different carry manners for a 4×4 pixel block, according to embodiments of the present invention. Any one of the carry manners shown in FIGS. 6 through 12 is capable of achieving similar function as the first embodiment.

Further, although as discussed in the first embodiment, the carry manner of the first frame is taken as the carry manner of an initial frame, the present invention is not restricted as such. For example, in another embodiment, the pixel block can be carried in a sequence of the second frame, the third frame, the fourth frame, and the first frame. In still another embodiment, the pixel block can be carried in a sequence of the third frame, the fourth frame, the first frame, and the second frame. In a further embodiment, the pixel block can also be carried in a sequence of the fourth frame, the first frame, the second frame, and the third frame. In such a way, similar function as the first embodiment can also be achieved.

Moreover, all above illustrated carry manners are applicable for images of red grey levels, green grey levels, or blue grey levels. Further, the display can also adopt different carry manners in accordance with grey levels of different colors, so as to achieve similar performance of the foregoing embodiments.

In summary, according to the present invention, when the LSB is 01 or 11, the carry manners of each pixel of the pixel block in two consecutive frames are asymmetric one to another. And therefore, the display performance of the display is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method for driving a display panel with a display driver, the method comprising:

obtaining a least significant bit (LSB) associated with a pixel block from the display panel, wherein the LSB is a 2 -bit number, the pixel block comprises 4×4 pixels which are (1, 1), (1, 2), (1, 3), (1, 4), (2, 1), (2, 2), (2, 3), (2, 4), (3, 1), (3, 2), (3, 3), (3, 4), (4, 1), (4, 2), (4, 3), and (4, 4), respectively;

reducing two bits from a bit number of each of the pixels of the pixel block;

determining whether to carry each of the pixels or not according to the LSB;

carrying the pixels (1, 1), (1, 3), (3, 1), and (3, 3) of the pixel block and remaining the rest pixels of the pixel block non-carried in a first frame, carrying the pixels (1, 4), (2, 2), (3, 4), and (4, 2) of the pixel block and remaining the rest pixels of the pixel block non-carried in a second frame, carrying the pixels (2, 1), (2, 3), (4, 1), and (4, 3) of the pixel block and remaining the rest pixels of the pixel block non-carried in a third frame, and carrying the pixels (1, 2), (2, 4), (3, 2), and (4, 4) of the pixel block and remaining the rest pixels of the pixel block non-carried in a fourth frame, when the LSB is 01 ; and remaining the pixels (1, 1), (1, 3), (3, 1), and (3, 3) of the pixel block non-carried and carrying the rest pixels of the pixel block in the first frame, remaining the pixels (1, 4), (2, 2), (3, 4), and (4, 2) of the pixel block non-carried and carrying the rest pixels of the pixel block in the second frame, remaining the pixels (2, 1), (2, 3), (4, 1), and (4, 3) of the pixel block non-carried and carrying the rest pixels of the pixel block in the third frame, and remaining the pixels (1, 2), (2, 4), (3, 2), and (4, 4) of the pixel block non-carried and carrying the rest pixels of the pixel block in the fourth frame, when the LSB is 11.

2. The image processing method according to claim 1, further comprising:

remaining each of the pixels non-carried in the first frame, the second frame, the third frame, and the fourth frame, when the LSB is 00.

3. The image processing method according to claim 1, further comprising:

carrying the pixels (1, 1), (1, 2), (2, 3), (2, 4), (3, 1), (3, 2), (4, 3), and (4, 4) and remaining the rest pixels of the pixel block non-carried in the first and third frames, and carrying the pixels (1, 3), (1, 4), (2, 1), (2, 2), (3, 3), (3, 4), (4, 1), and (4, 2) and remaining the rest pixels of the pixel block non-carried in the second and fourth frames, when the LSB is 10.

4. The image processing method according to claim 1, further comprising:

carrying the pixels (1, 3), (1, 4), (2, 1), (2, 2), (3, 3), (3, 4), (4, 1), and (4, 2) and remaining the rest pixels of the pixel block non-carried in the first and third frames, and carrying the pixels (1, 1), (1, 2), (2, 3), (2, 4), (3, 1), (3, 2), (4, 3), and (4, 4) and remaining the rest pixels of the pixel block non-carried in the second and fourth frames, when the LSB is 10.

5. The image processing method according to claim 1, further comprising:

carrying the pixels (1, 1), (1, 4), (2, 2), (2, 3), (3, 2), (3, 3), (4, 1), and (4, 4) and remaining the rest pixels of the pixel block non-carried in the first and third frames, and carrying the pixels (1, 2), (1, 3), (2, 1), (2, 4), (3, 1), (3, 4), (4, 2), and (4, 3) and remaining the rest pixels of the pixel block non-carried in the second and fourth frames, when the LSB is 10.

6. The image processing method according to claim 1, further comprising:

carrying the pixels (1, 2), (1, 3), (2, 1), (2, 4), (3, 1), (3, 4), (4, 2), and (4, 3) and remaining the rest pixels of the pixel block non-carried in the first and third frames; and carrying the pixels (1, 1), (1, 4), (2, 2), (2, 3), (3, 2), (3, 3), (4, 1), and (4, 4) and remaining the rest pixels of the pixel block non-carried in the second and fourth frames, when the LSB is 10.

7. The image processing method according to claim 1, wherein the pixels (1, 1), (1, 4), (4, 1) and (4, 4) are distributed at an upper left corner, an upper right corner, a lower left corner, and a lower right corner of the pixel block, respectively.

8. The image processing method according to claim 1, wherein the pixels (1, 1), (1, 4), (4, 1) and (4, 4) are distributed at an upper right corner, an upper left corner, a lower right corner, and a lower left corner of the pixel block.

9. The image processing method according to claim 1, wherein the first frame, the second frame, the third frame, and the fourth frame are consecutive frames sequentially.

10. The image processing method according to claim 1, wherein the second frame, the third frame, the fourth frame, and the first frame are consecutive frames sequentially.

11. The image processing method according to claim 1, wherein the third frame, the fourth frame, the first frame, and the second frame are consecutive frames sequentially.

12. The image processing method according to claim 1, wherein the fourth frame, the first frame, the second frame, and the third frame, are consecutive frames sequentially.

13. The image processing method according to claim 1, wherein each of the pixels of the pixel block in a $4N+1^{th}$ frame is carried in a same carry manner as in the first frame, each of the pixels of the pixel block in a $4N+2^{th}$ frame is carried in a same carry manner as in the second frame, each of the pixels of the pixel block in a $4N+3^{th}$ frame is carried in a same carry manner as in the third frame, and each of the pixels of the pixel block in a $4N+4^{th}$ frame is carried in a same carry manner as in the fourth frame, wherein N is a natural number greater than 0.

* * * * *